US006968805B1

(12) United States Patent
Rathbun (10) Patent No.: US 6,968,805 B1
(45) Date of Patent: Nov. 29, 2005

(54) FUEL LEVEL INDICATOR FOR A PORTABLE FUEL TANK

(76) Inventor: Donald William Rathbun, 6671 Beech Creek Dr., Fruitport, MI (US) 49415

( * ) Notice: Subject to any disclaimer, the term of this patent is extended or adjusted under 35 U.S.C. 154(b) by 0 days.

(21) Appl. No.: 10/710,047

(22) Filed: Jun. 15, 2004

(51) Int. Cl.⁷ ............................................ G01F 23/00
(52) U.S. Cl. .................. 116/227; 116/333; 116/334; 73/296; 177/169; 177/170
(58) Field of Search .................. 116/227, 229, 204, 116/333–334; 33/465, 471, 531, 534, 613; 177/164, 168–170, 173, 245; 73/296

(56) References Cited

U.S. PATENT DOCUMENTS

| 335,223 | A | | 2/1886 | Hexamer | |
|---|---|---|---|---|---|
| 840,582 | A | | 1/1907 | O'Neill | |
| 2,330,857 | A | * | 10/1943 | Alcott | 177/45 |
| 2,575,110 | A | | 11/1951 | Kerr | |
| 3,434,134 | A | | 3/1969 | Batchelor | |
| 3,958,527 | A | | 5/1976 | Iannacone | |
| 4,245,505 | A | * | 1/1981 | Baynes | 73/296 |
| 4,319,651 | A | * | 3/1982 | Robichaud | 177/229 |
| 4,382,478 | A | * | 5/1983 | Hearn | 177/169 |
| 4,413,515 | A | * | 11/1983 | Quinn | 73/296 |
| 4,474,255 | A | * | 10/1984 | Blok et al. | 177/146 |
| 4,524,617 | A | * | 6/1985 | Krehel et al. | 73/296 |
| 5,156,297 | A | * | 10/1992 | Engler | 222/23 |
| 5,186,159 | A | * | 2/1993 | Crow et al. | 126/41 R |
| 6,148,668 | A | * | 11/2000 | Sieg | 73/296 |
| 6,284,987 | B1 | * | 9/2001 | Al-Modiny | 177/170 |
| 2001/0032504 | A1 | * | 10/2001 | Moseley | 73/290 R |

\* cited by examiner

Primary Examiner—Christopher W. Fulton
Assistant Examiner—Tania Courson
(74) Attorney, Agent, or Firm—McGarry Bair PC (57) ABSTRACT

A fuel level indicator for a portable fuel tank comprises a base, a platform hingedly connected to the base, a biasing member between the base and the platform to bias one end of the platform away from the base, and a visual indicator. When the fuel level indicator is positioned under one edge of a full portable fuel tank, the platform pivots to a first position where the visual indicator indicates a full tank, and as fuel is withdrawn from the tank, the platform pivots toward a second position where the visual indicator indicates a less than full tank.

19 Claims, 7 Drawing Sheets

Fig. 10

FUEL LEVEL INDICATOR FOR A PORTABLE FUEL TANK

FIELD OF THE INVENTION

The invention relates to a device for visually indicating a level of fuel contained within a fuel tank.

DESCRIPTION OF THE RELATED ART

Portable fuel tanks are commonly used to store fuel, such as propane or other liquefied petroleum gases, for powering portable or outdoor appliances, such as outdoor barbecues, deep fryers, patio heaters, mosquito eradication devices, and various devices in recreational vehicles. These fuel tanks, also referred to as fuel cylinders, come in varying sizes having varying capacities, and the most common size of propane fuel tank is a 20 pound cylinder, which is the size used for outdoor barbeques. The size of the tank is determined by the appliance and its power requirements. Further, portable tanks are sized such that the user can transport the tank to a fuel dealer for refilling when the fuel in the tank becomes depleted.

Because fuel tanks are constructed from metal for strength and puncture resistance, the tank walls are opaque, and, thus, the user cannot visually observe the level of fuel in the tank. Oftentimes, the user will periodically lift the tank, which can be heavy and difficult to pick up, to estimate how much fuel is left in the tank. When the weight of the tank seems to be relatively low, the user decides that the tank needs to be refilled. Obviously, this method is subjective and can lead to either premature refilling of fuel tanks or unexpected depletion of fuel. Both situations are undesirable; in the former case, the user will, on average, make more trips to the dealer than necessary, and in the latter case, the appliance powered by the fuel cannot be utilized until the user refills the tank. As a remedy to unexpected fuel depletion, some consumers keep a spare full fuel tank on hand, but this practice is inconvenient, and the spare tank must be stored outside in a safe manner. Such problems can be avoided if the user can visually determine the level of fuel in a fuel tank with the aid of a fuel level indicator. Further, it is desirable to have a fuel level indicator that can be quickly installed without tools and without having to lift the entire fuel tank from the supporting surface.

SUMMARY OF THE INVENTION

A fuel level indicator for a portable fuel tank comprises a base; a platform having a first end and second end wherein the first end is hingedly connected to the base; a biasing member between the base and the platform to bias the second end away from the base; a front wall extending upwardly from the base; a stop on the front wall to limit movement of the second end of the platform away from the base; and a visual indicator on one of the platform and the front wall. The spring force of the biasing member is selected so that when the fuel level indicator is positioned under one edge of a full portable fuel tank, the platform will be pivoted to a first position where the second end is adjacent the base and the visual indicator will indicate a full tank, and as fuel is withdrawn from the tank, the platform will pivot toward a second position where the second end is adjacent the stop and the visual indicator will indicate a less than full tank.

The fuel level indicator can further comprise a limiting guide to indicate a preferred positioning for the portable fuel tank relative to the fuel level indicator when the portable fuel tank is positioned under the one edge of the portable fuel tank. The limiting guide can comprise at least one flange extending upwardly from the stop, and when the portable fuel tank is positioned under the one edge of the portable fuel tank, the one edge of the portable fuel tank is adjacent the at least one flange. Alternatively, the limiting guide can comprise at least one protrusion on the platform.

The fuel level indicator can further comprise a window in the front wall to view the visual indicator as the platform pivots toward the second position. The stop can comprise at least one extension on the front wall and can partially define the window.

The biasing member can be a compression spring in abutting contact with the base and the platform. The compression spring can be located at the second end of the platform. Alternatively, the compression spring can be located about midway between the first end and the second end of the platform. The fuel level indicator can further comprise a spring guide to retain the compression spring at a desired location between the first end and the second end of the platform. The spring guide can comprise an indentation in the platform. The biasing member can alternatively be a torsion spring disposed at the hinge connection between the base and the platform.

The visual indicator can comprise an indicium on a flange depending from the platform. Alternatively, the visual indicator can be an indicium on the front wall. The indicium can be a color bar or a scale.

The base and the platform can be composed of metal, and the metal can be galvanized steel. The platform can comprises spaced downwardly extending flanges to form a U-shaped body.

DETAILED DESCRIPTION

Referring now to the figures, FIGS. 1–5 illustrate a first embodiment of a fuel level indicator 10 for visually indicating a level of fuel within a portable fuel tank 80. A typical fuel tank 80 comprises a cylindrical side wall 82, a bottom wall 84 joined along an edge 86 to the side wall 82, and a top wall 88 opposite the bottom wall 84. The exemplary fuel tank 80 shown in the figures is for illustrative purposes and is not intended to limit the invention in any manner. The fuel level indicator 10 can be utilized with any suitable style of fuel tank.

Figure 1:
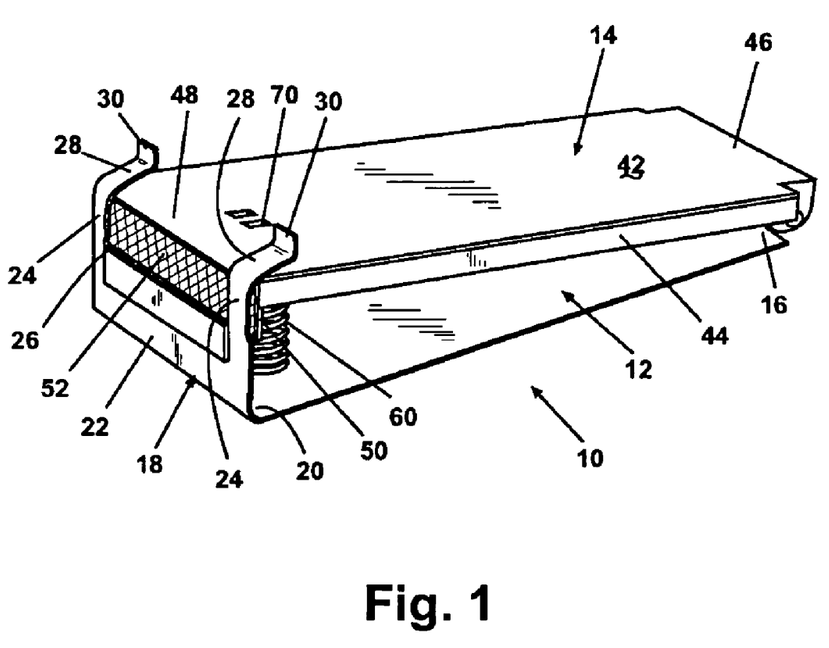
FIG. 1 is a perspective view of a fuel level indicator according to the invention.
Figure 2:
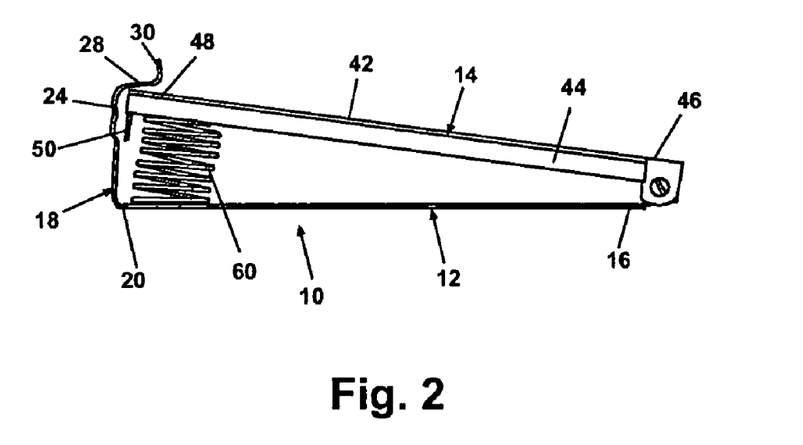
FIG. 2 is a side view of the fuel level indicator of FIG. 1.
Figure 3:
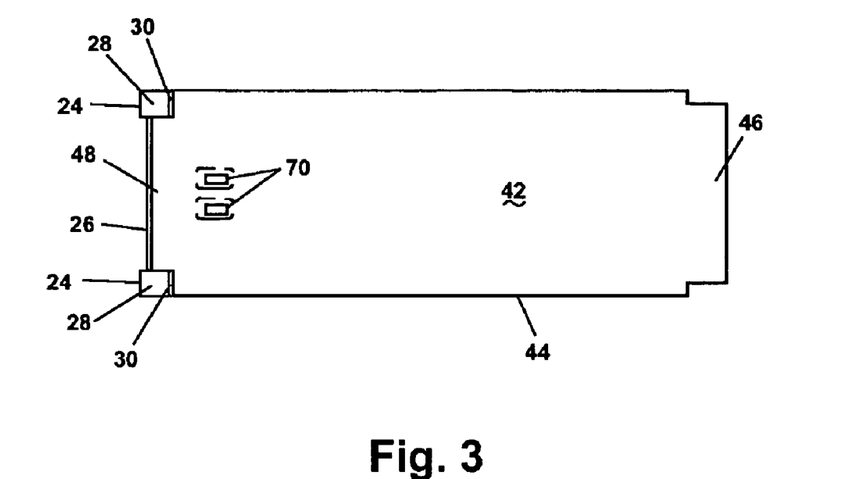
FIG. 3 is a top view of the fuel level indicator of FIG. 1.

The fuel level indicator 10 is a compact, wedge-shaped device comprising a planar base 12 hingedly connected at a first end 16 to a platform 14 and integral with an upwardly extending front wall 18 at a second end 20. In use, the base 12 rests on a supporting surface, and the platform 14 partially supports the fuel tank 80. The front wall 18 is generally orthogonal relative to the base 20 and includes a lower portion 22, spaced arms 24 extending upwardly from the lower portion 22, and a window 26 coplanar with the lower portion 22 and defined between the lower portion 22 and the spaced arms 24. Preferably, each of the lower portion 22 and the window 26 accounts for about half of the height H1 of the front wall 18. The front wall 18 further comprises stops 28 on the spaced arms 24 for limiting movement of the platform 14. The stops 28 extend substantially perpendicularly from the spaced arms 24 and, thus, are substantially parallel to the base 12. Alternatively, the front wall 18 can comprise a single stop. For example, the stops 28 could join to create a unitary stop that defines an upper boundary of the window 26. The front wall 18 further comprises a limiting guide in the form of flanges 30 that extend upwardly from the stops 28 for indicating a preferred positioning of the fuel tank 80 when it partially rests on the platform 14. Preferably, the flanges 30 are oriented substantially perpendicular to the flanges 30 and, thus, parallel to the lower portion 22 of the front wall 18.

The platform 14 comprises a planar surface 42 shaped and sized similarly to the base 12 and having downwardly depending side flanges 44 that, along with the planar surface 42, form a U-shaped body. The flanges 44 add strength to the platform 14 so that it can partially support the weight of the fuel tank 80. Analogous to the base 12, the platform 14 comprises a first end 46 and a second end 48, and the platform 14 is hingedly connected to the base 12 at the first end 46. At the second end 48, the platform 14 terminates at a depending flange 50 with a height H2 preferably equal to or greater than the distance between the stops 28 and the lower portion 22 of the front wall 18 (i.e., height of the window 26). The flange 50 sits behind the window 26 and moves relative to the window 26 when the platform 14 pivots relative to the base 12. Further, the flange 50 comprises a visual indicator 52 with an indicium for communicating to the user the level of fuel within the fuel tank 80. In the present embodiment, the indicium is a color bar, and the amount of the color bar that is visible in the window 28 is indicative of the level of fuel within the fuel tank 80, as will be described in more detail hereinafter.

The base 12 and the platform 14 are both preferably constructed of metal, such as steel. Further, the metal is preferably corrosion resistant or made to be corrosion resistant to withstand outdoor environments. An exemplary corrosion resistant metal is galvanized steel, such as steel coated with zinc. Alternatively, the base 12 and the platform 14 can be constructed of a high strength ceramic or polymer.

The second end 48 of the platform 14 is biased away from the base 12 by a biasing member. In this embodiment, the biasing member is a compression spring 60 positioned between and abutting the base 12 and the platform 14. The compression spring 60 is preferably located at the second ends 20, 48 of the base 12 and the platform 14. As best viewed in FIG. 3, the indicator 10 can further comprise a spring guide 70, which is illustrated in the figures as indentations in the platform 14, to retain the compression spring 60 at a desired location relative to the first and second ends 46, 48 of the platform 14.

Figure 4:
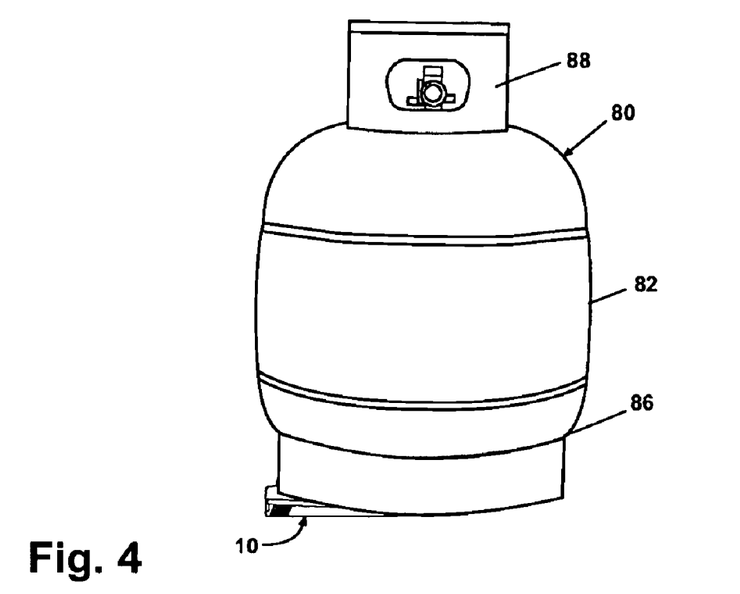
FIG. 4 is a side view of a substantially full fuel tank situated on the fuel level indicator of FIG. 1.

The platform 14 is pivotable relative to the base 12 between a first position, as shown in FIG. 4, and a second position, as illustrated in FIGS. 1–3 and 5. Downward force, such as that resulting from the weight of a full fuel tank 80, applied to the platform 14 to overcome the force of the compression spring 60 forces the platform 14 to pivot towards the base 12 to the first position. In the first position, the second end 48 of the platform 14 is adjacent the base 12, and the visual indicator 52 is positioned behind the lower portion 22 of the front wall 18 such that the user cannot view the visual indicator 52 through the window 26. As the downward force decreases, such as while fuel is withdrawn from the fuel tank 80, the spring force overcomes the downward force and pivots the platform 14 towards the second position. In the second position, the second end 48 of the platform 14 is adjacent the stops 28, which abut the platform 14 to prevent further upward movement thereof, and the visual indicator 52 is positioned directly behind the window 26 such that the user can view the indicium through the window 26. Hence, when the platform 14 is in the first position, substantially none of the indicium is viewable through the window 26, and, conversely, the entire window 26 is filled with the indicium when the platform 14 is in the second position. Correspondingly, the visual indicator 52 indicates that the fuel tank 80 is full when the platform 14 is in the first position and empty, almost empty, or otherwise less than full when the platform 14 is in the second position. When the platform 14 is between the first and second positions, the amount of the indicium that is visible through the window 26 is indicative of the level of the fuel in the fuel tank 80. To ensure accuracy of the visual indicator 52, the biasing member is selected so that the force exerted thereby is sufficient to overcome the weight of an empty, almost empty, or otherwise less than full fuel tank 80 and pivot the platform 14 to the second position yet can be overcome by the weight of a full fuel tank 80 to pivot the platform 14 to the first position.

Figure 5:
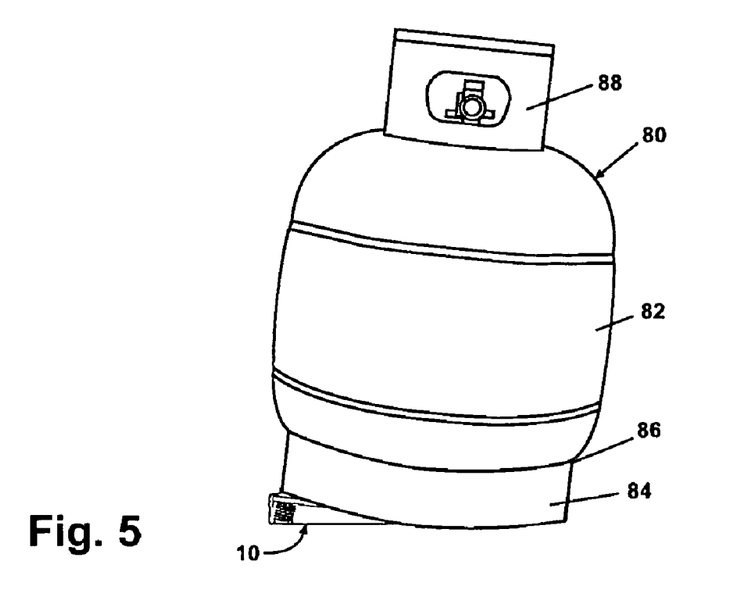
FIG. 5 is a side view of a less than full fuel tank situated on the fuel level indicator of FIG. 1.

Referring particularly to FIGS. 4 and 5, to utilize the fuel level indicator 10, the user positions the fuel level indicator 10 beneath the fuel tank 80. Specifically, the user raises a portion of the tank edge 86 from the supporting surface and inserts the first ends 16, 46 of the base 12 and platform 14 of the fuel level indicator 10 under the bottom wall 84 of the fuel tank 80. Preferably, the user aligns the fuel level indicator 10 relative to the fuel tank 80 so that the edge 86 of the fuel tank 80 is adjacent the flanges 30 to locate the fuel tank 80 at the preferred positioning. The user then releases the fuel tank 80, and the bottom wall 84 of the fuel tank 80 rests on the platform 14 and applies a downward force against the bias of the compression spring 60. If the fuel tank 80 is full, then the platform 14 pivots to the first position, and the visual indicator 52 indicates a full tank, as described previously. As fuel is withdrawn from the fuel tank 80, the weight of the fuel tank 80 decreases, and the spring force overcomes the downward force exerted by the fuel tank 80. As a result, the platform 14 pivots towards the second position where the visual indicator 52 indicates that the fuel tank 80 is empty, almost empty, or otherwise less than full, as described previously. By observing the visual indicator 52, the user can visually observe the level of fuel within the fuel tank 80 as the platform 14 moves from the first position to the second position. When the user determines that the fuel tank 80 needs to be refilled or otherwise desires to remove the fuel level indicator 10, the user again raises a portion of the edge 86 of the fuel tank 80 and then pulls the fuel level indicator 10 from underneath the fuel tank 80. If the user owns multiple appliances that utilize portable fuel tanks 80, the user can easily move the fuel level indicator 10 from one fuel tank 80 to another to check the levels fuel in each fuel tank 80. Because the user does not have to lift the entire fuel tank 80 from the supporting surface to insert or remove the fuel level indicator 10, a single fuel level indicator 10 can be easily moved from one fuel tank 80 to another, and the fuel level indicator 10 can be employed by a variety users having differing strength abilities.

Figure 6:
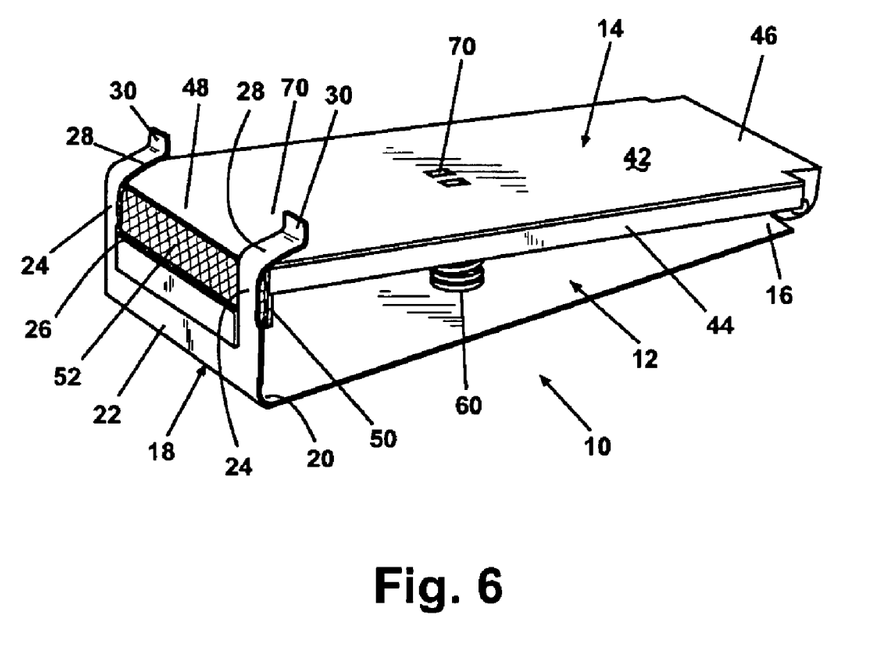
FIG. 6 is a perspective view of a second embodiment of a fuel level indicator according to the invention.
Figure 7:
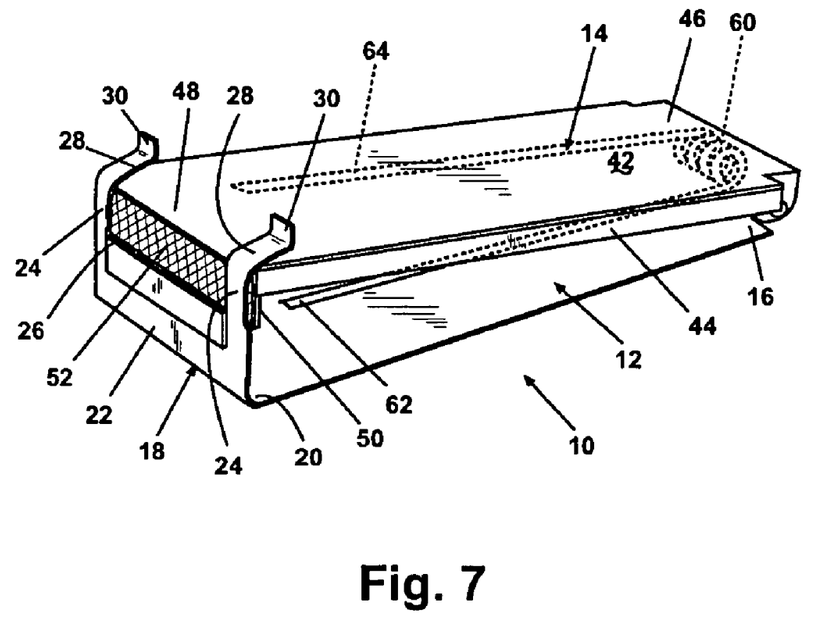
FIG. 7 is a perspective view of a third embodiment of a fuel level indicator according to the invention.

In the above description of the first embodiment, the biasing member is a compression spring 60 located near the second end 48 of the platform 14. However, it is within the scope of the invention for other types of biasing members, such as torsion springs and leaf springs, to be utilized in combination with or in place of the compression spring 60. Further, the biasing member can be positioned in any suitable location on the fuel level indicator 10. For example, in a second embodiment fuel level indicator 10 shown in FIG. 6, where like elements are identified with the same reference numerals, the compression spring 60 is positioned approximately halfway between the first end 46 and the second end 48 of the platform 14. A third embodiment fuel level indicator 10 illustrated in FIG. 7, where like elements are identified with the same reference numerals, comprises a torsion spring 60 as the biasing member, and the torsion spring 60 is positioned at the hinge connection between the base 12 and the platform 14. The torsion spring 60 has a first end 62 and a second end 64 that abut the base 12 and the platform 14, respectively, to bias the second end 48 of the platform 14 away from the base 12. The other elements of the second and third embodiments are identical to those of the first embodiment.

Although the indicium on the visual indicator 52 in the first embodiment fuel level indicator 10 is a color bar positioned on the flange 50 depending from the platform 14, it is within the scope of the invention to locate the visual indicator 52 elsewhere, such as on the front wall 18 of the base 12 or on both the base 12 and the platform 14. Further, the indicium can assume many forms, such as a color bar of a single color, a color bar of different colors that indicate different levels of fuel, or a scale having indicia corresponding to different levels of fuel.

Figure 8:
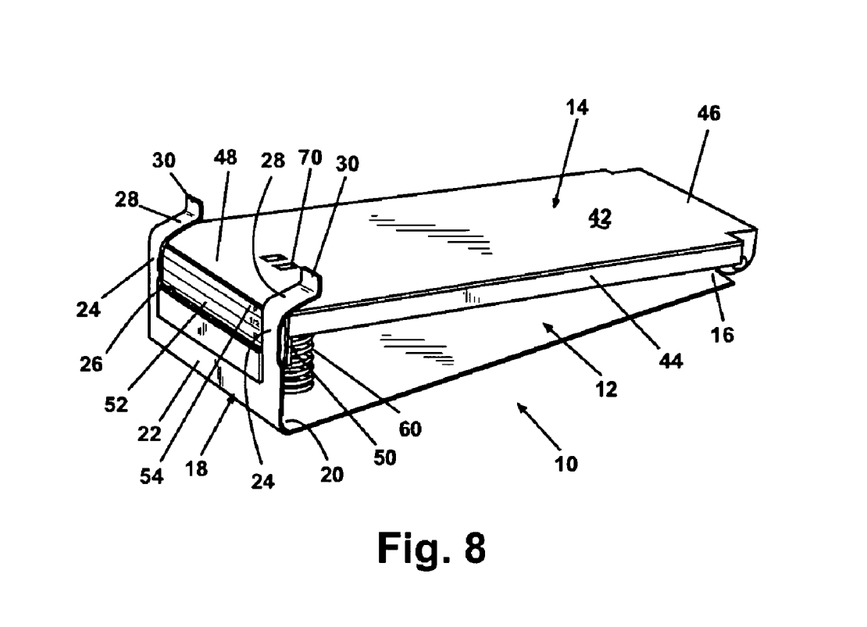
FIG. 8 is a perspective view of a fourth embodiment of a fuel level indicator according to the invention.
Figure 9:
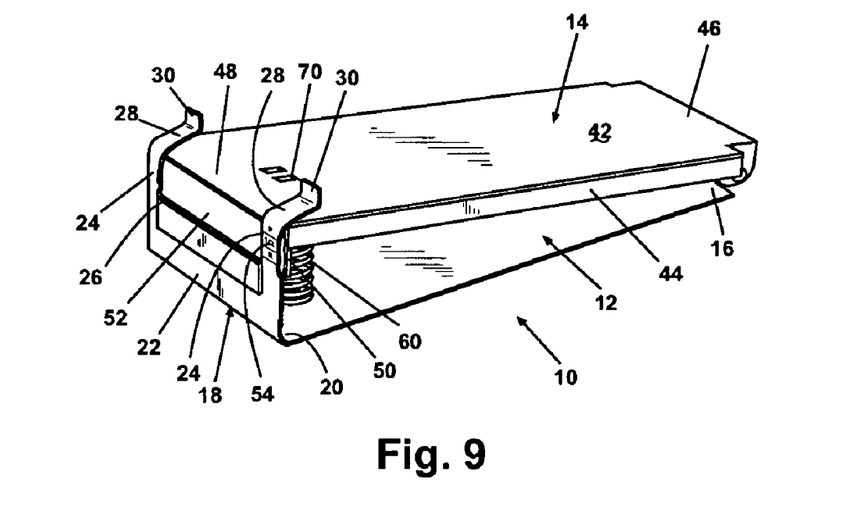
FIG. 9 is a perspective view of a fifth embodiment of a fuel level indicator according to the invention.

Referring to FIGS. 8 and 9, where like elements are identified with the same reference numerals, fourth and fifth embodiments, respectively, of the fuel level indicator 10 provide examples of a visual indicator 52 having a scale as the indicium. In the fourth embodiment, the scale is located on the depending flange 50 and comprises scale indicia 54 that correspond to full, half full, and empty fuel levels. All other components of the fourth embodiment are identical to those of the first embodiment. The user determines the level of fuel by observing relative positions of depending flange 50 and the lower portion 22 of the front wall 18. In other words, the scale indicia 54 move relative to the lower portion 22, and the level of fuel is determined by identifying where the upper edge of the lower portion 22 coincides with the scale indicia 54. The fifth embodiment is essentially the same as the fourth embodiment, except that the indicium is a scale located on the spaced arms 24 of the front wall 18, and the level of fuel is determined by observing the position of the planar surface 42 of the platform 14 relative to the scale indicia 54.

Figure 10:
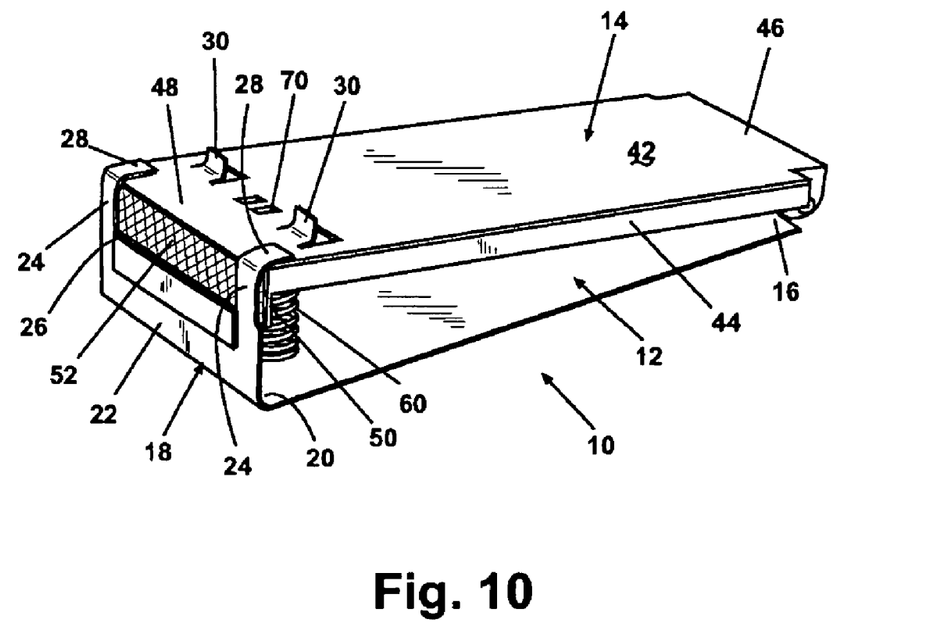
FIG. 10 is a perspective view of a sixth embodiment of a fuel level indicator according to the invention.

In the previous embodiments, the limiting guide for indicating the preferred positioning of the fuel tank 80 was shown and described as flanges 30 that extend upwardly from the stops 28. However, the limiting guide can assume other forms and can be located elsewhere on the fuel level indicator 10. For example, in a sixth embodiment fuel level indicator 10 shown in FIG. 10, where like objects are identified with the same reference numerals, the limiting guide is at least one of protrusion on the platform 14. In particular, the limiting guide is in the form of spaced flaps 30 cut from the planar surface 42 of the platform 14 and bent away from the platform 14 such that they protrude above the planar surface 42. The position of the flaps 30 on the planar surface 42 indicates the preferred location of the edge 86 of the fuel tank 80. Positioning the limiting guide on the platform 14 ensures that the tank 80 is not accidentally placed on the stops 28, which would reduce the amount of weight carried by the platform 14 and, in turn, affect the accuracy of the fuel level indicator 10.

While the invention has been specifically described in connection with certain specific embodiments thereof, it is to be understood that this is by way of illustration and not of limitation, and the scope of the appended claims should be construed as broadly as the prior art will permit.

What is claimed is:

1. A fuel level indicator for a portable fuel tank comprising:
   a base;
   a platform having a first end and second end wherein the first end is hingedly connected to the base;
   a biasing member between the base and the platform to bias the second end away from the base;
   a front wall extending upwardly from the base;
   a stop extending from the front wall to limit movement of the second end of the platform away from the base; and
   a visual indicator on one of the platform and the front wall;
   wherein a spring force of the biasing member is selected so that when the fuel level indicator is positioned under one edge of a full portable fuel tank, the platform will be pivoted to a first position where the second end is adjacent the base and the visual indicator will indicate a full tank, and as fuel is withdrawn from the tank, the platform will pivot toward a second position where the second end is adjacent the stop and the visual indicator will indicate a less than full tank.

2. The fuel level indicator according to claim 1 and further comprising a limiting guide to indicate a preferred positioning for the portable fuel tank relative to the fuel level indicator when the fuel level indicator is positioned under the one edge of the portable fuel tank.

3. The fuel level indicator according to claim 2 wherein the limiting guide comprises at least one flange extending upwardly from the stop, and when the portable fuel tank is positioned under the one edge of the portable fuel tank, the one edge of the portable fuel tank is adjacent the at least one flange.

4. The fuel level indicator according to claim 2 wherein the limiting guide comprises at least one protrusion on the platform.

5. The fuel level indicator according to claim 1 and further comprising a window in the front wall to view the visual indicator as the platform pivots toward the second position.

6. The fuel level indicator according to claim 1, wherein the biasing member is a compression spring in abutting contact with the base and the platform.

7. The fuel level indicator according to claim 6, wherein the compression spring is located at the second end of the platform.

8. The fuel level indicator according to claim 6, wherein the compression spring is located about midway between the first end and the second end of the platform.

9. The fuel level indicator according to claim 6 and further comprising a spring guide to retain the compression spring at a desired location between the first end and the second end of the platform.

10. The fuel level indicator according to claim 9, wherein the spring guide comprises an indentation in the platform.

11. The fuel level indicator according to claim 1 wherein the biasing member is a torsion spring disposed at the hinge connection between the base and the platform.

12. The fuel level indicator according to claim 1, wherein the visual indicator comprises an indicium on a flange depending from the platform.

13. The fuel level indicator according to claim 12, wherein the indicium is a color bar.

14. The fuel level indicator according to claim 12, wherein the indicium is a scale.

15. The fuel level indicator according to claim 1, wherein the visual indicator comprises an indicium on the front wall.

16. The fuel level indicator according to claim 15, wherein the indicium is a scale.

17. The fuel level indicator according to claim 1, wherein the base and the platform are composed of metal.

18. The fuel level indicator according to claim 17, wherein the metal is galvanized steel.

19. The fuel level indicator according to claim 1, wherein the platform comprises spaced downwardly extending flanges to form a U-shaped body.

* * * * *